United States Patent [19]
Modigh

[11] Patent Number: 5,038,504
[45] Date of Patent: Aug. 13, 1991

[54] DATE CODING PLAY BALLS

[75] Inventor: Johan G. Modigh, Taastrup, Denmark

[73] Assignee: Euro-Matic Ltd., London, England

[21] Appl. No.: 444,276

[22] Filed: Dec. 1, 1989

[30] Foreign Application Priority Data

Dec. 6, 1988 [GB] United Kingdom ............. 8828481.5

[51] Int. Cl.⁵ ...................... B44F 7/00; A63B 45/02; A63B 39/00
[52] U.S. Cl. .................................. 40/327; 273/50 B; 273/58 K; 249/103
[58] Field of Search .......... 40/327; 273/65 EE, 58 A, 273/58 K, 58 B, 58 R, 58 BA; 249/103

[56] References Cited

U.S. PATENT DOCUMENTS 4,660,834 4/1987 Carrigan ..................... 273/58 B
4,874,169 10/1989 Litchfield ..................... 273/58 K Primary Examiner—George J. Marlo
Attorney, Agent, or Firm—Ostrolenk, Faber, Gerb & Soffen

[57] ABSTRACT

A hollow molded article such as a ball of the kind used in play areas where children jump on and swim through a volume of the balls. During molding, date coding is impressed on the balls in a way which enables the older balls to be identified and replaced when necessary. The date coding is provided in two ways, one is to provide an adjustable pin within a part of the mold cavity, and the other is to provide indicia whose positions can be changed by rotation of the air venting plug within the mold.

6 Claims, 1 Drawing Sheet

DATE CODING PLAY BALLS

BACKGROUND AND SUMMARY OF THE INVENTION

The present invention relates to molded articles, for example, hollow plastic balls. In our U.K Patent Specification 1 119 176 we disclose an apparatus for molding hollow plastic articles such as balls. These balls may be used for various leisure activities but one particular usage is in children's playpen areas.

These playpen areas will be filled with balls, and children will leap around and swim through the sea of balls. What often happens then is that balls get stood or jumped on and this reduces their life. The problem is to know which balls to replace.

The present invention provides a particularly convenient method of date or batch recording for use on molded hollow articles such as balls.

Accordingly the invention provides a hollow molded article such as a ball in which the wall surface comprises at least two adjacent regions whose shapes are determined by corresponding adjacent parts of a mold cavity, The mold cavity parts being adjustable in position relative to one another and each having a shaping so that the molded article carries corresponding shapings whose relative positions indicate a batch or time of manufacture.

By the term shaping we mean a protuberance, indentation, or other marking which will be visible in the finished article in distinction from the intended general overall shape of the article.

In one form of the invention the air venting plug of a molding apparatus comprises a shaping in the form of markings corresponding approximately to a clock face, and includes an adjustable pin whose head defines a shaping and which can be inserted in one of a number of different holes in the mold face of the air venting plug. The corresponding shapings on the molded article, i.e. the clock face, and an indentation corresponding to the position of the pin head can then be used as an indication of the year of manufacture.

Often the air venting plug in a molding apparatus forms a small hemispherical segment of the blow molding cavity. In another form of the invention therefore, the air venting plug forms a minor hemispherical segment of the mold cavity and includes markings corresponding approximately to a clockface, and a permanent mark such as a pinhead sized indentation is provided as the shaping in an adjacent part of the mold cavity. Adjustment of the air venting plug by rotation changes the relative position between the pinhead sized shaping and the clock face shaping, so that in the molded article a different time, for example a different month of manufacture is indicated.

In a preferred form of the invention these two aspects are combined to provide indications of both year and month of manufacture.

BRIEF DESCRIPTION OF THE DRAWINGS

An embodiment of the invention will now be described by way of example with reference to the accompanying diagrammatic drawings in which.

DETAILED DESCRIPTION

A blow molding apparatus similar in overall form to the apparatus described in U.K Patent 1,119,176 is used to blow mold hollow plastic balls which are used in children's playpens. The only significant difference from that described in U.K Patent 1,119,176 is that the mold cavity includes an air venting plug of the kind shown in FIG. 2. The normal use of the air venting plug is to provide an air passage to the exterior so that when blow molding takes place the wall of the article closely takes up the shape of the mold wall without formation of surface air pockets.

Figure 1:
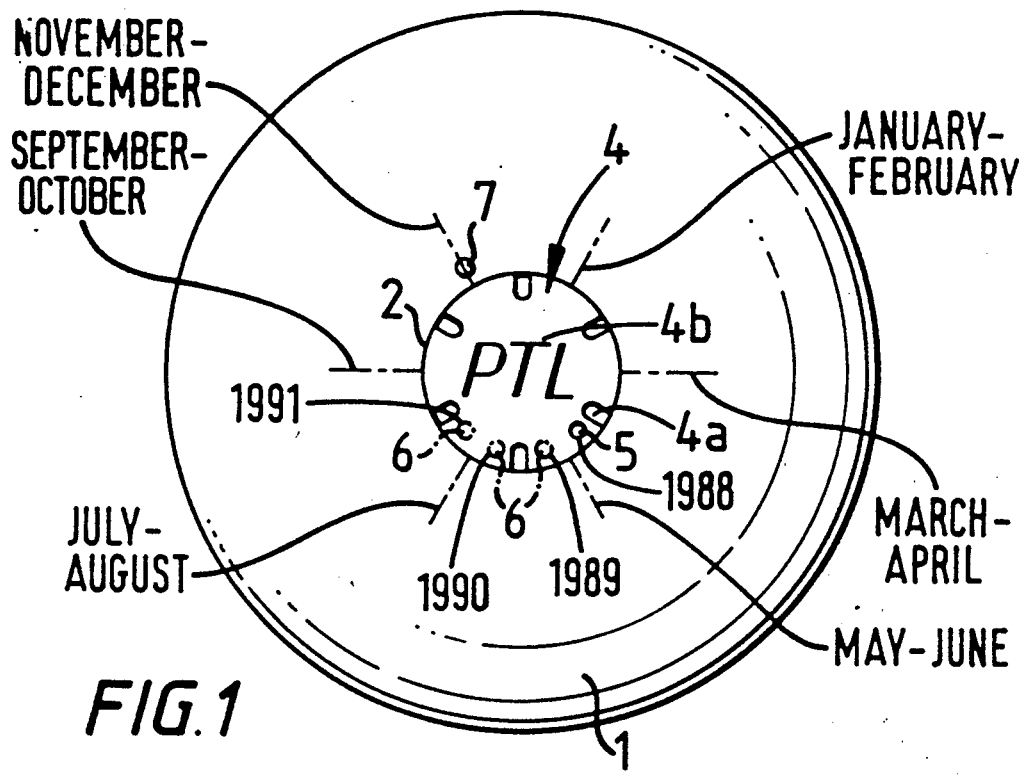
FIG. 1 is a view of a ball incorporating the invention.

FIG. 1 shows a view of a ball 1 embodying the invention.

A minor hemispherical segmental zone 2 formed by the molding segment of an air venting plug 3 (see FIG. 2) carries a notional clock face 4 with timing marks 4a and branding information 4b. The type face of the branding information 4b identifies the correct orientation of the clock face, i.e. top and bottom, without the need for specific numbers, and six equally spaced timing markings 4a around the periphery of the plug thus notionally represent the clock face.

A pin 5, which can be placed in any one of several spaced holes 6 round the clock face is used to represent the year of manufacture.

Dependent on the position of the pin 5, an indentation will appear on the ball in relation to the clock face so as to represent the year of manufacture.

Figure 2:
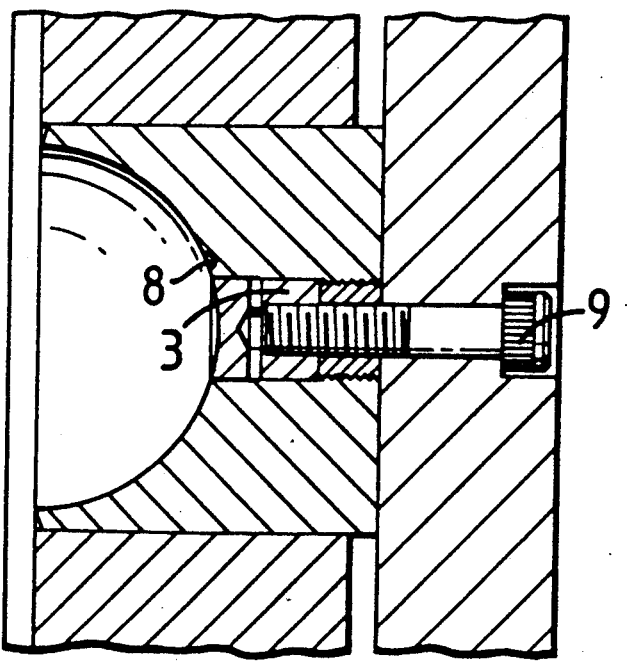
FIG. 2 is a sectioned side elevation of part of a blow molding apparatus.

Periodically, therefore, i.e. once a year, the molding assembly of FIG. 2 will be taken apart and the position of the pin can then be adjusted for the year of manufacture.

The month of manufacture is represented by a pinhead sized protuberance 7 on the surface of the article shown in FIG. 1. This protuberance 7 is created by interaction with a corresponding indentation 8 in the mold cavity of the apparatus shown in FIG. 2.

Adjustment of the relative position of the protuberance 7 is made by rotation of the air venting plug 3 via an adjustment screw 9 which is accessible from the outside of the machine without the need for dissembling the molding machine. In fact the clock face rotates by virtue of this adjusting action while the marking 7 remains in a fixed position but in the finished article this is irrelevant since the ball marking is orientated by the print on its center and the apparent position of the marking 7 will have changed relative to the clock face.

I claim:

1. A first and second plurality of hollow molded articles, each of said articles comprising a wall defining the article, each said wall having an outer wall surface, and a plurality of markings on each said outer wall surface, all of said articles being substantially identical but for said markings on the outer wall surfaces thereof, and said markings on the outer wall surfaces of all of said articles being substantially identical with the exception that on said first plurality of articles the position of at least one date indicating marking is at a first predetermined location relative and adjacent a circular array of markings and an adjacent orientation marking for said circular array of markings, and on said second plurality of markings the position of a like at least one data indicating marking, relative a like circular array of markings and an adjacent orientation marking, is at a second predetermined location spaced a discernible distance from said first predetermined location along a path generally following the path defined by the adjacent circular array of markings, and the different locations of each said at least one date indicating marking identifying for each said plurality of articles its date of manufacture or its manufacturing batch so that the first and second plurality of articles may be distinguished from each other to facilitate the replacing of older articles with new articles.

2. The articles of claim 1, wherein the articles are balls.

3. The articles of claim 2, wherein the balls have structural characteristic corresponding to those resulting from being formed in a mold and the markings result from the contacting of the outer wall surface, during the formation thereof, with first and second parts of the mold.

4. The articles of claim 3, wherein the at least one date indicating marking has a construction corresponding to that which results from the contacting of the outer wall surface with a second part of the mold.

5. The articles of claim 4, wherein the first and second mold parts are movable relative to one another to define the date of manufacture.

6. The articles of claim 5, wherein each date indicating marking indicates a calendar year.

* * * * *